(12) United States Patent
Zhodzishsky et al.

(10) Patent No.: US 12,399,281 B2
(45) Date of Patent: Aug. 26, 2025

(54) METHOD OF MEASURING PHASE IONOSPHERE SCINTILLATIONS

(71) Applicant: Topcon Positioning Systems, Inc., Livermore, CA (US)

(72) Inventors: Mark Isaakovich Zhodzishsky, Moscow (RU); Alexey Vasilievich Bashaev, Moscow (RU); Roman Valerievich Kurynin, Moscow (RU); Ivan Michailovich Sokolov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 17/918,959

(22) PCT Filed: May 16, 2022

(86) PCT No.: PCT/RU2022/000159
§ 371 (c)(1),
(2) Date: Oct. 14, 2022

(87) PCT Pub. No.: WO2023/224508
PCT Pub. Date: Nov. 23, 2023

(65) Prior Publication Data
US 2024/0295662 A1 Sep. 5, 2024

(51) Int. Cl.
*G01S 19/07* (2010.01)
*G01S 19/14* (2010.01)
(Continued)

(52) U.S. Cl.
CPC ............ *G01S 19/072* (2019.08); *G01S 19/14* (2013.01); *G01S 19/29* (2013.01); *G01S 19/37* (2013.01); *G01S 19/396* (2019.08)

(58) Field of Classification Search
CPC ...... G01S 19/072; G01S 19/396; G01S 19/14; G01S 19/29; G01S 19/37
See application file for complete search history.

(56) References Cited

U.S. PATENT DOCUMENTS 6,313,789 B1 11/2001 Zhodzishsky et al.
9,488,729 B2 * 11/2016 Averin .................... G01S 19/32
(Continued)

FOREIGN PATENT DOCUMENTS

CN 109188474 A 1/2019
CN 110824520 A 2/2020

OTHER PUBLICATIONS

Search Report in PCT/RU2022/000159, dated Feb. 2, 2023.
Written Opinion in PCT/RU2022/000159, dated Feb. 2, 2023.

*Primary Examiner* — Elias Desta
(74) *Attorney, Agent, or Firm* — Bardmesser Law Group

(57) ABSTRACT

Method of measuring ionosphere scintillation phase index Sigma-Phi, the method including, for each of N satellites being tracked, calculating a phase prediction at an i-th sample; for each of the N satellites, calculating an individual loop discriminator signal based on the phase prediction; rejecting the i-th samples of some of the N satellites, where K non-rejected satellites remain; calculating common loop discriminator signal based on the individual loop discriminator signals of non-rejected K satellites; calculating a phase estimate and a Doppler frequency estimate at the i-th sample for each of the N satellites based on individual loop discriminator signal; calculating test statistic based on the phase estimate at the i-th sample and an observed phase for each of the N satellites; calculating index Sigma-Phi as standard deviation estimation of the test statistic for each of the N satellites; and outputting the index Sigma-Phi for each of the N satellites.

30 Claims, 3 Drawing Sheets

(51) Int. Cl.
*G01S 19/29* (2010.01)
*G01S 19/37* (2010.01)
*G01S 19/39* (2010.01)

(56) References Cited

U.S. PATENT DOCUMENTS 11,333,769 B2 * 5/2022 Morley .................. G01S 19/05
2017/0139050 A1   5/2017 Curran et al.
2023/0417925 A1 * 12/2023 Da Silveira Rodrigues ................
                                                G01S 19/41

* cited by examiner

METHOD OF MEASURING PHASE IONOSPHERE SCINTILLATIONS

BACKGROUND OF THE INVENTION

Field of the Invention

The present invention relates to measurements of phase ionospheric scintillations using a GNSS receiver.

Background of the Related Art

Navigation receivers are used to receive radio signals from a plurality of navigation satellites and further process the signals to determine the location of a user, device, equipment, or machinery. In one example, the location (coordinates) of a movable device (such as grader, dozer etc.) can be determined with the use of code and phase measurements from the received radio signals.

The signal on its way from the GNSS satellite to the receiver antenna passes through the ionosphere and troposphere. As noted in [IS-001], solar ionization can cause ionospheric plasma structures, which often contain irregularities. Such irregularities may cause rapid phase and/or amplitude variations in the signal. These variations are termed scintillations. As marked in [IS-001], the intense scintillations may cause anomalies in satellite signal measurements (such as in phase estimate, as well as energy (SNR) estimate of locked signal) and even may be reason of loss of signal tracking. These anomalies in signal measurements usually affect precision of the position output by receiver, so it is very important to reject or decrease weights of such abnormal measurements when solving the navigation task to determine high-precision receiver position. To specify correct weights of the measurements, one must measure the intensity of such phase scintillations. Accordingly, the invention is directed to measuring such phase ionosphere scintillations.

In state-of-art literature (e.g. in [IS-001-IS-003]), special metrics to estimate the amplitude and phase scintillations are described, namely: index S4 to measure amplitude scintillations and index Sigma-Phi ($\sigma_\varphi$) to measure phase scintillations.

The Sigma-Phi index is the standard deviation of the detrended carrier phase $\varphi$ and can be determined as follows [IS-001]:

$$\sigma_\varphi = \langle \varphi^2 \rangle - \langle \varphi \rangle^2, \quad \text{(b. 1)}$$

where the brackets indicate the expected value, in practice replaced by temporal averaging. The Sigma-Pi index is measured in units the same as the phase estimate is measured (e.g., in radians or in meters).

As discussed in [IS-002], phase noise caused by scintillations can be hidden under receiver oscillator's phase noise; and it is explained by using low-cost, temperature-compensated crystal oscillator (TCXO) in most GNSS receivers. To overcome such a drawback, [IS-002-IS-003] suggest using more expensive high-stable frequency reference such as a high-quality oven-controlled crystal oscillator (OCXO) or a rubidium reference standard. Unlike known disclosed methods, the proposed methods do not require using high-stable frequency reference for Sigma-Phi index estimation.

In addition to positioning, the estimates of S4 and Sigma-Phi indices themselves are of practical value in research studies and special applications related to estimation and prediction of ionosphere characteristics. There are also special GNSS receivers for such purpose.

Terms Used

1. Co-Op is a conditional name for heuristic algorithms that use both common loops for tracking common effects for all GNSS satellites (movements of the antenna phase center and frequency fluctuations of the receiver quartz), and individual loops for tracking individual effects (e.g., fluctuations for each satellite frequency of the onboard standard of this satellite, satellite-specific atmospheric delays during signal propagation).

Note that even if all Co-Ops are obtained heuristically, they can also be obtained by a number of simplifications of the synthesized Kalman structures.

2. Primary Co-Ops are intended for primary processing of radio signals, namely, for their synchronization in carrier phase (phase Co-Ops) and in delay of the PRN code (code Co-Ops). In the traditional structures, these tasks are performed, respectively, by carrier synchronization systems (PLLs, FLLs) and delay tracking circuits (DLLs). Tracking systems that carry out primary processing operate at a control frequency $F_c$ that is on the order of (200 . . . 1000) Hz.

In the current discussion only phase Co-Op will be considered, and word "phase" will be omitted for brevity.

To the best of the inventors' knowledge, only primary Co-Op are considered in the literature.

3. In this application. one of the versions of secondary Co-Op has been considered. In this option, the processing of full phases is performed with an exemplary control frequency $F_c$ from 1 to 50 Hz.

The equations describing primary and secondary Co-Ops are to some extent similar, although their properties differ in many ways. First of all, primary Co-Ops incorporate non-linear discriminators, both in individual loops (phase detectors) and in common loops. Therefore, primary Co-Ops are multi-loop closed non-linear tracking systems in which cycle slips can occur: a complete slip or a short-term slip with a transition to a new stable tracking point. In contrast, secondary Co-Op are fundamentally linear systems.

4. Single-parameter Co-Ops known from the technical literature have only one common loop—a quartz one, designed to monitor the frequency (phase) fluctuations of receiver's quartz standard. We also call these Co-Ops as QLL (Quartz Locked Loop).

5. Multi-parameter Co-Ops known from the technical literature, in addition to the quartz common loop, have at least three more geometric common loops designed to track the movements of the receiver phase center along three spatial axes (for example, along the X, Y, Z axes of the geocentric coordinate system or axes E, N, U of the local coordinate system). Such Co-Ops are called CQLL (Coordinate-Quartz Locked Loop).

Patents and publications mostly describe primary Co-Ops. Thus, we briefly consider primary Co-Ops, which are the closest circuits to secondary Co-Ops, although, as noted above, there are key differences between primary and secondary Co-Ops.

In U.S. Pat. No. 6,313,789 B1 there are described both common loops and individual loops, both multi-parameter Co-Op (CQLL) and single-parameter Co-Op (QLL). Note that in primary Co-Ops, common loop and/or individual loop should be at least second or third order. In the present invention they can be first order.

In U.S. Pat. No. 6,313,789 B1 and in paper [ION-98] there was noted that the main problem of the Co-Ops described is penetration of anomalies from one satellite channel (from one individual loop) to other satellite channels (other individual loops) via common loop, i.e., the so-called cross interference.

In U.S. Pat. No. 7,495,607, there was proposed a method of avoiding this cross interference. In the present invention, a different, in principle, method of fighting with cross interference is proposed.

In U.S. Pat. No. 8,618,981 and U.S. Ser. No. 10/976,442 B1, there are considered wideband single-parameter Co-Op (i.e., wideband QLL) to combat vibrations of the receiver quartz. To achieve the maximum bandwidth of the common loop, they use a high control frequency $F_c^q \approx 1$ kHz, which is considerably exceeds that of individual loop $F_c^{ind} \approx 200$ Hz, and first order common loop with a great gain, in particular, with $\alpha^q = 1$.

Secondary QLL is discussed in U.S. Pat. No. 8,319,683. This publication describes extrapolation of base receivers' phases performed at a rover. With a certain clock, (for example, 1 time per second) through the Internet or via a separate radio link for transmitting differential corrections, the base phases values corresponding to certain points in time arrive at the rover. The problem of extrapolating the values of the base receivers' phases to other points in time, following with a clock cycle, for example, 0.1 sec, is being solved. To solve this problem, in U.S. Pat. No. 8,319,683 there are used individual loops (but with completely different parameters compared with the present invention). A correction signal $\Delta\varphi_i^q$ is also outputted but in a different way than signal $Z_i^Q$ of the present invention.

With the above in mind, there is a need in the art for a better method and system for measuring phase ionosphere scintillations (index Sigma-Phi $\sigma_\varphi$).

SUMMARY OF THE INVENTION

In a first aspect of the present invention, a method of measuring ionosphere scintillation phase index Sigma-Phi ($\sigma_\varphi$), the method including, for each of N satellites being tracked, calculating a phase prediction at an i-th sample; for each of the N satellites, calculating an individual loop discriminator signal based on the phase prediction; rejecting the i-th samples of some of the N satellites, such that K non-rejected satellites remain; calculating a common loop discriminator signal based on the individual loop discriminator signals of the non-rejected K satellites; calculating a phase estimate and a Doppler frequency estimate at the i-th sample for each of the N satellites based on the individual loop discriminator signal; calculating a test statistic based on the phase estimate at the i-th sample and an observed phase for each of the N satellites; calculating index Sigma-Phi ($\sigma_{1\varphi Q}$) as standard deviation estimation of the test statistic for each of the N satellites; and outputting the index Sigma-Phi for each of the N satellites.

Optionally, the phase prediction ($\overline{\varphi}_i^j$) is calculated as a sum of: 1) a phase estimate $\hat{\varphi}_{i-1}^j$ of the j-th satellite at a previous (i−1)-th sample; 2) a product of a Doppler frequency estimate $\hat{\omega}_{i-1}^j$ and an epoch duration of $T_e$; and 3) a calculated phase increment $\Delta_i^j$ of the j-th satellite over the epoch duration of $T_e$ due to a movement of the j-th satellite as follows:

$$\overline{\varphi}_i^j = \hat{\varphi}_{i-1}^j + \hat{\omega}_{i-1}^j T_e + \Delta_i^j.$$

Optionally, the rejecting is based on signal to noise ratio (SNR) of each of the N satellites. Optionally, N and K can vary from i-th sample to (i+1)-th sample. Optionally, the individual loop discriminator signal ($Z_i^j$) is calculated as a difference between the observed phase $\varphi_i^j$ and its prediction $\overline{\varphi}_i^j$ as follows:

$$Z_i^j = \varphi_i^j - \overline{\varphi}_i^j.$$

Optionally, those individual loop discriminator signals ($Z_i^j$) for which either SNR estimate $SNR_i^j$ is less than a threshold $h_{SNR}$ or signal $Z_i^j$ is outside a range $\pm h_\varphi$, are rejected.

Optionally, the common loop discriminator signal ($Z_i^Q$) is calculated as a weight mean based on the individual loop discriminator signals of the non-rejected K satellites according to $$Z_i^Q = \frac{\sum_{j=1}^K w_i^j Z_i^j}{\sum_{j=1}^K w_i^j},$$

wherein weights $w_i^j$ for K non-rejected individual loop discriminator signals are set as follows:

$$w_i^j = 10^{0.1 SNR_i^j}.$$

Optionally, the phase estimate ($\hat{\varphi}_i^j$) and the Doppler frequency estimate ($\hat{\omega}_i^j$) at the i-th sample for each of the N satellites are calculated based on the common loop discriminator signal ($Z_i^Q$) as follows:

$$\left. \begin{array}{l} \hat{\varphi}_i^j = \overline{\varphi}_i^j + \alpha^{ind} \cdot (Z_i^j - Z_i^Q) + \alpha^q Z_i^Q \\ \hat{\omega}_i^j = \hat{\omega}_{i-1}^j + \dfrac{\beta^q}{T_e} Z_i^Q \end{array} \right\},$$

wherein $\alpha^q$ is a transfer coefficient for a proportional branch of the common loop filter in a range of 0.3 to 1, $\alpha^{ind}$ is a transfer coefficient for a proportional branch of the individual loop filter in a range of 0.05 to 1, and $\beta^q$ is a transfer coefficient for an integrating branch of the common loop filter in a range of 0.05 to 1.

Optionally, the test statistic ($\varepsilon_{\varphi,i}^j$) for each of the N satellites is calculated based on the phase estimate $\hat{\varphi}_i^j$ at the i-th sample and the observed phase $\varphi_i^j$ as follows:

$$\varepsilon_{\varphi,i}^j = \varphi_i^j - \hat{\varphi}_i^j.$$

In another aspect, a method of measuring ionosphere scintillation phase index Sigma-Phi ($\sigma_\varphi$), the method including, for each of the N satellites being tracked, calculating coordinates $x_i^j$, $y_i^j$, $z_i^j$ of each j-th navigation satellite at an i-th sample, and calculating its clock offset $q_i^j$ at a moment of signal generation; predicting extended receiver clock offset (eRCO) at the i-th sample; for each of the N satellites, calculating ranges $D_i^j$; for each of the N satellites, calculating a phase prediction based on the prediction of the eRCO; for each of the N satellites, calculating a corrected observed phase based on the phase prediction; for each of the N satellites, calculating an individual loop discriminator signal based on the corrected observed phase; rejecting the i-th samples of some of the N satellites, such that K non-rejected satellites remain; calculating a common loop discriminator signal based on the individual loop discriminator signals of the K non-rejected satellites; calculating an eRCO estimate based on the common loop discriminator signal; estimating phase and drift velocity of the eRCO based on the eRCO estimate; for each of the N satellites, calculating a refined phase estimate based on the eRCO estimate; for each of the N satellites, calculating a refined corrected phase based on the refined phase estimate; for each of the N satellites, calculating a refined individual loop discriminator signal based on the refined corrected phase; for each of the N satellites, calculating a refined estimate of the corrected phase based on the refined individual loop discriminator signal; calculating a smoothed test statistic based on the refined estimate of the corrected phase for each of the N satellites; calculating index Sigma-Phi ($\sigma_{100}$) as a standard deviation estimation of the test statistic for each of the N satellites; and outputting the index Sigma-Phi for each of the N satellites.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
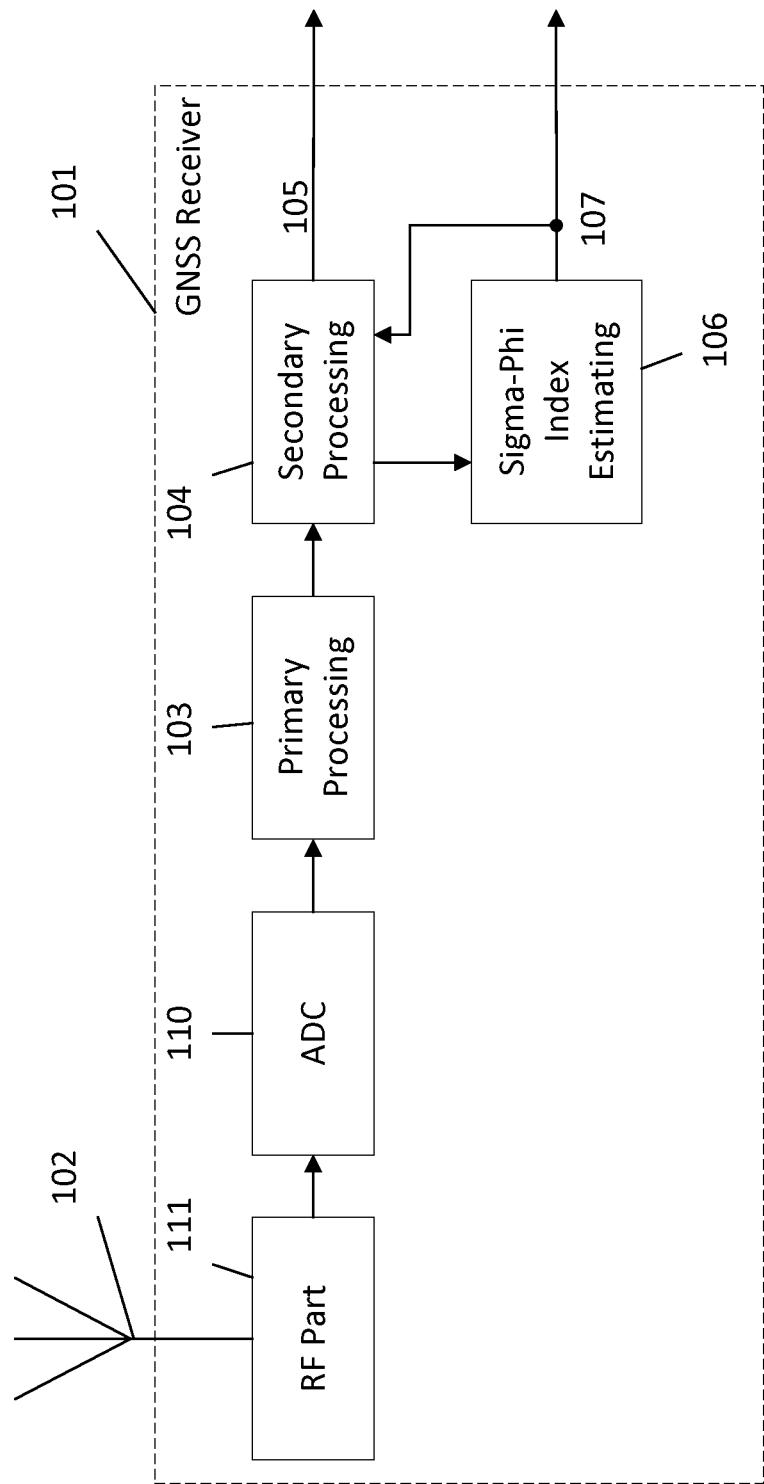
FIG. 1 illustrates a GNSS receiver that may be used in the invention.

Reference will now be made in detail to the preferred embodiments of the present invention, examples of which are illustrated in the accompanying drawings.

Table 1 shows a list of notations used in this text.

TABLE 1

| Notations | | |
|---|---|---|
| Designation | Description | Notes |
| Indices and integer numbers | | |
| i | Sample number of outputting raw data (for secondary processing) with control period $T_e$ | |
| j | Satellite number | End-to-end numbering of satellites of all GNSS is used. |
| $i_j$ | Sample number with a period of outputting raw data at which j-th satellite is locked. | |
| $z_j$ | Sample number with a period of outputting raw data counted out from the moment of locking the j-th satellite. This index is separately used for each j-th satellite | $z_j = i - i_j$ |
| z | It is also the sample number with period of outputting raw data which can be zeroed. This index is used in the second order loop filter with coefficients $\alpha_z^{smooth}$, $\beta_z^{smooth}$; and also used in calculating coefficients $\alpha_z^q$, $\beta_z^q$ | |
| N | The number of satellites being tracked at the i-th sample | |
| K | The number of non-rejected by the algorithm satellites at the i-th sample, which are used at calculating extended receiver clock offset estimate | |

TABLE 1-continued

Notations

| Designation | Description | Notes |
|---|---|---|
| *Periods* | | |
| $T_e$ | Period [sec] of outputting raw data for secondary processing | |
| $T_{obs}$ | Period [sec] of outputting a single estimate of variance $\hat{D}_\varphi^{j,\,T_{obs}}$ for test statistic | $T_{obs}$ = 1, 3, 10, 30 or 60 s (according to the literature) for $\sigma_\varphi$ |
| *Coordinates* | | |
| $x_0, y_0, z_0$ | Known receiver coordinates [m] (obtained, for example, by long-term averaging of stand alone coordinates) | |
| $x_i^j, y_i^j, z_i^j$ | The coordinates of the j-th satellite [m] at the moment of signal emission | These are calculated according to ephemeris information |
| $q_i^j$ | Clock offset of the j-th satellite [m] at the moment of signal emission | |
| *Receiver clock offset (RCO) and extended RCO* | | |
| $\hat{q}_i, \bar{q}_i$ | Extended RCO estimate and prediction "inside" the algorithm [m] | |
| $\hat{Q}_i, \bar{Q}_i$ | Extended RCO estimate and prediction in an external smoothing filter [m] | |
| $\hat{q}_i^P$ | RCO estimate based on code measurements (in initialization) [m] | |
| $\delta_i^Q$ | Discriminator signal of the external smoothing filter [m] | |
| $\hat{V}_i; \bar{V}_i$ | Estimation and prediction of the extended RCO drift velocity based on an external smoothing filter [m/s] | |
| *Ranges to satellite and its corrections* | | |
| $D_i^j; D_{rot,\,i}^j$ | A priori range estimates [m] and a correction to Earth rotation [m] | |
| $D_{trop,\,i}^j$ | Estimate of troposphere delay [m] | Calculated based on the troposphere model |
| *Phases* | | |
| $\varphi_i^j$ | Observed phase [m] | |
| $\bar{\varphi}_i^j; \bar{\varphi}_{calc,\,i}^j; \varphi_{calc,\,i}^j;$ $\Phi_{calc,\,i}^j; \delta\varphi_i^j; \delta\Phi_i^j;$ $\delta\varphi_i^j; \delta\bar{\varphi}_i^j$ | Various values of phases [m] (prediction values and estimates) | |
| $\hat{\varphi}_i^j$ | Phase estimate [m] | |
| *Frequencies* | | |
| $\hat{\omega}_i^j, \bar{\omega}_i^j$ | Estimation and prediction of the frequency of the Doppler shift for the j-th satellite [m/s] | |
| *Pseudo-ranges* | | |
| $\rho_i^j$ | Observed pseudo-range [m] (based on code measurements) | |
| $\rho_{calc,\,i}^j; \delta\rho_i^j$ | Different values of pseudo-ranges [m] | |
| *Discriminators* | | |
| $\zeta_i^j; Z_i^j; Z_i^Q$ | Discriminator signals [m] | |
| *Test statistics and their statistical characteristics* | | |
| $\varepsilon_{\varphi,\,i}^j; \varepsilon_{\varphi,\,i}^{smooth,\,j}$ | Test statistics [m] and its smoothed estimate [m] to increase contrast | |
| $\hat{m}_\varphi^{j,\,T_{obs}}$ | Estimate of expected value (EV) [m] of the smoothed test statistics outputted with period $T_{obs}$ | |
| $\hat{D}_\varphi^{j,\,T_{obs}}$ | Estimate of variance [m²] of the smoothed test statistics outputted with period $T_{obs}$ | |
| *Coefficients* | | |
| $\alpha^{smooth}, \beta^{smooth}$ | Coefficients of second order loop filter used in the algorithm in variant #2 | |
| $\alpha^q, \beta^q$ | Coefficients of second order loop filter used in the algorithm in variant #1 | |

TABLE 1-continued

Notations

| Designation | Description | Notes |
|---|---|---|
| $\alpha^{ind}, \alpha^{\varphi}$ | Coefficients of first order loop filter used in the individual loop of the j-th satellite | |
| $\alpha^{\varepsilon}$ | Coefficient of digital RC circuit used to smooth test statistic in variant #2. | |

In the table above and the text below, all phases and distances are in meters ([m]), and velocities and frequencies—in meters per second ([m/s]).

In the text below a so-called single RC-circuit operating with period $T_e$ is used as a model. Its bandwidth $B_L^{RC}$, time constant $\tau^{RC}$ and coefficient $\alpha^{RC}$ are related as follows:

$$\alpha^{RC} = 1 - \exp(-4T_e B_L^{RC}) = 1 - \exp\left(-\frac{T_e}{\tau^{RC}}\right). \quad (1)$$

A GNSS receiver has well-known structure, described, e.g., in [Book-1] and shown in FIG. 1.

A radio signal emitted by GNSS satellite is fed to antenna 102 in FIG. 1 and then is processed by RF part 111 of the receiver. As a result, digital samples of so-called correlated components are output from RF part and fed to input of block 103, that provides primary processing of received signal. The block 103 estimates phase and code delay of received signal, as well as its power (e.g. estimates SNR), and also process information transmitted by satellite (e.g. ephemeris information). These measurements and received information is fed to block 104, that uses them to solve navigation task: it estimates receiver position and/or velocity and output them by line 105.

In the proposed approach, the data output by the block 104 are fed to block 106 that estimates Sigma-Phi Index value and output it by line 107. There are two preferable variants of block 106 implementation in the invention. Both variants use single-parameter Co-Op, which will be described below.

Variant #1

Section (A): i-th Step of the Algorithm

Let us assume that (i−1)-th step has completed and the following variables have been calculated:

$$\hat{\varphi}_{i-1}^j, \hat{\omega}_{i-1}^j$$

which represent respectively phase and Doppler frequency estimations of received signal from the j-th satellite.

At the beginning of the i-th step, new variables representing observed (raw) phase of received signal from j-th satellite are generated in from block 104

$$\varphi_i^j.$$

Below are the operations that need to be successively performed to get variables $$\hat{\varphi}_i^j, \hat{\omega}_i^j.$$

and final residual (or test statistic)

$$\varepsilon_{\varphi,i}^j.$$

These operations are listed as steps C-1 through C-9 below.

C-1. Calculate a phase prediction $\bar{\varphi}_i^j$ of the j-th satellite (from N being tracked) at the i-th sample and a prediction of its Doppler frequency at the i-th sample:

$$\left.\begin{array}{l}\bar{\varphi}_i^j = \hat{\varphi}_{i-1}^j + \hat{\omega}_{i-1}^j T_e + \Delta_i^j \\ \bar{\omega}_i^j = \hat{\omega}_{i-1}^j\end{array}\right\} \quad (2)$$

Here $\Delta_i^j$ is a correction of phase for movement of the j-th satellite calculated based on the ephemeris information.

C-2. Calculate the discriminator signal of the j-th individual loop (primary residual)

$$Z_i^j = \varphi_i^j - \bar{\varphi}_i^j. \quad (3)$$

C-3. Reject (for step C-5) those signals $Z_i^j$, for which either SNR estimate $SNR_i^j$ is less than threshold $h_{SNR}$ (for example, 20-25 dB·Hz) or signal $Z_i^j$ outstands the range $\pm h_\varphi$ (for example, 0.05 m). Only K non-rejected satellites are left from N satellites.

C-4. Assign weights for K non-rejected satellites:

$$w_i^j = 10^{0.1 SNR_i^j}. \quad (4)$$

C-5. Calculate the value of the common loop discriminator signal:

$$Z_i^Q = \frac{\sum_{j=1}^K w_i^j Z_i^j}{\sum_{j=1}^K w_i^j}. \quad (5)$$

C-6. Calculate the value of the corrected individual loop discriminator signal:

$$\delta_i^j = Z_i^j - Z_i^Q. \quad (6)$$

C-7. Calculate phase estimate at the i-th sample and an estimate of Doppler frequency at the i-th sample:

$$\left.\begin{array}{l}\hat{\varphi}_i^j = \overline{\varphi}_i^j + \alpha^{ind} \cdot \delta_{z,i}^j + \alpha^q Z_i^Q \\ \hat{\omega}_i^j = \overline{\omega}_i^j + \dfrac{\beta^q}{T_e} Z_i^Q\end{array}\right\}, \quad (7)$$

where the transfer coefficient $\alpha^q$ for proportional branch of common loop filter can be computed as follows:

$$\alpha^q = \frac{2(2z-1)}{z(z+1)}, \quad (8)$$

and the transfer coefficient $\beta^q$ for integrating branch of common loop filter can be computed as follows:

$$\beta^q = \frac{6}{z(z+1)} \quad (9)$$

and the transfer coefficient $\alpha^{ind}$ for integrating branch of individual loop filter can be computed as follows:

$$\alpha^{ind} = \frac{1}{z}. \quad (10)$$

Magnitudes z are determined by bandwidths of common loop and individual loop and differs from each other: for individual loop z takes values in a range 1 to 10, and for common loop—in a range 2 to 8.

C-8. Calculate secondary residuals (test statistics):

$$\varepsilon_{\varphi,i}^j = \varphi_i^j - \hat{\varphi}_i^j. \quad (11)$$

C-9. Process test statistics by algorithm described below. As a result of operation of the test statistics processing algorithm, the user gets the desired index value $\sigma_\varphi$ with a period of 60 sec.

Figure 2:
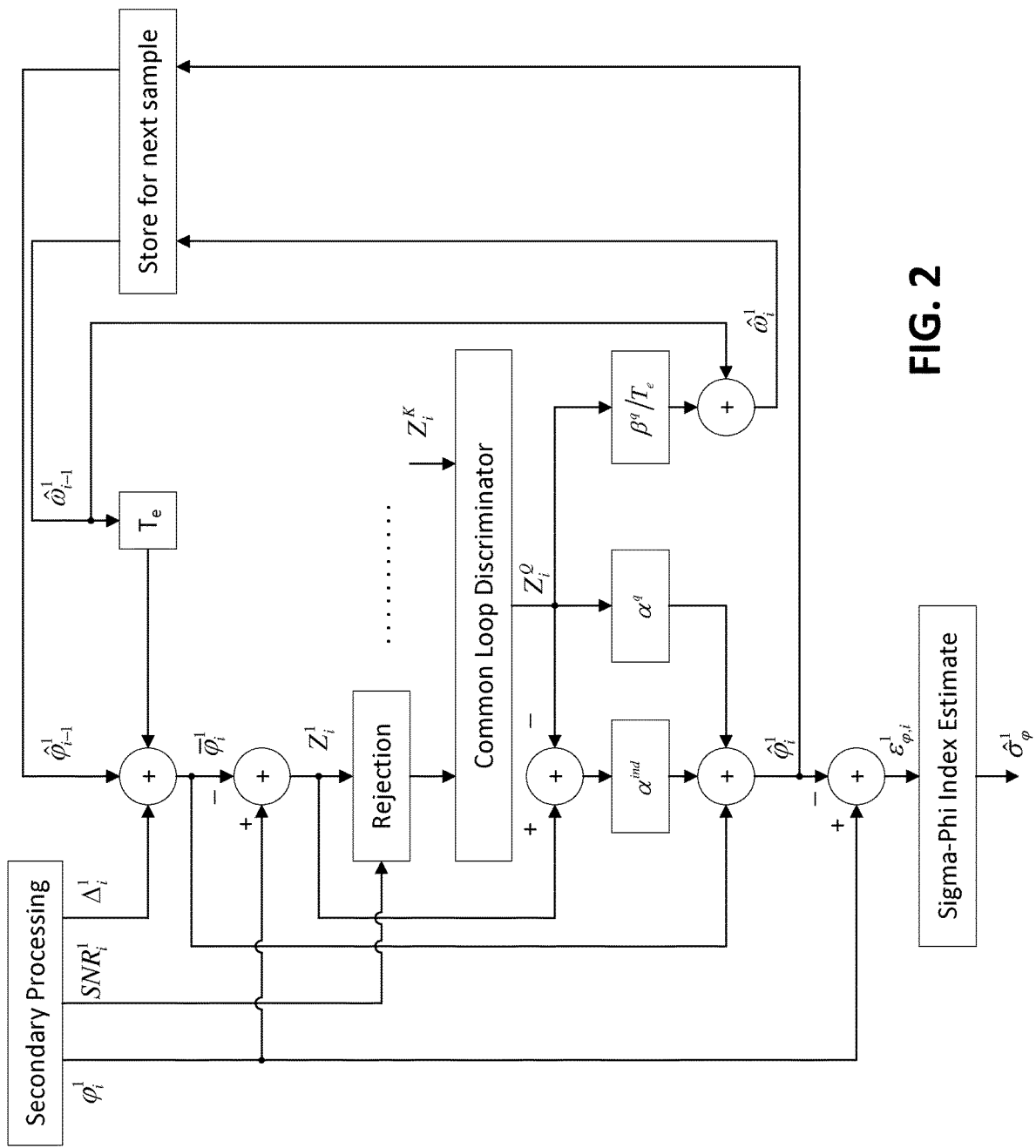
FIG. 2 illustrates a flowchart for measuring phase ionosphere scintillations according to the first embodiment.

FIG. 2 illustrates a flowchart for determining a phase of ionosphere scintillations according to the first embodiment. Operations (2), (3), (5), (6), (7) and (11) are illustrated for one (first) satellite (j=1). For the rest of the tracked satellites (from j=2 up to j=N) these operations are similar.

Input values for carrying out operations on the i-th sample in FIG. 2 are:

(1) Calculated at the previous (i−1)-th sample for the 1-st satellite, phase estimate $\hat{\varphi}_{i-1}^1$ and Doppler frequency estimate of $\hat{\omega}_{i-1}^1$;
(2) Phase $\varphi_i^1$ measured by the receiver;
(3) Phase increment $\Delta_i^1$ calculated based on ephemeris information over the duration of the i-th epoch (from t=(i−1)$T_e$ up to i$T_e$) due to satellite movement and the Earth's rotation.

Output values of FIG. 2 are
(1) new (for i-th sample) phase estimate $\hat{\varphi}_i^1$ and Doppler frequency estimate $\hat{\omega}_i^1$;
(2) the estimation of IS index Sigma-Phi of this first satellite calculated by resulting residual $\varepsilon_{\varphi,i}^1$ used as test statistics. Algorithm to estimate index value by test statistics is described below.

Section (B): Algorithm Initialization

Assume that the algorithm shown in FIG. 2 and corresponding steps C-1 . . . C-9 in Section (A) starts to work from the sample with number i=1. Then, to initiate this algorithm, initial values of two variables (phase and Doppler frequency estimates) need to be assigned at the sample i=0. Phase value at the sample i=0 can be taken as $\hat{\varphi}_0^j$:

$$\hat{\varphi}_0^j = \varphi_0^j, \quad (12)$$

and as an estimate of the Doppler frequency, the value of the Doppler frequency shift given by the receiver as part of the raw data at sample i=0 is taken as:

$$\hat{\omega}_0^j = \omega_0^j. \quad (13)$$

This completes the initialization algorithm (at the i-th sample), at the next (i+1)-th sample, the "main" algorithm works according to the variant #1.

Section (C): Simplified Method of Processing Test Statistics

So, using the steps C-1 . . . C-8 of the algorithm described above, random numbers $\varepsilon_{\varphi i}^j$ (i=1, 2, 3 . . . ) are obtained; and further, standard deviation of this random process $\varepsilon_{\varphi i}^j$ need to be determined. Generally, this random process $\varepsilon_{\varphi i}^j$ is not stationary, since its standard deviation can vary in time, so estimates of its standard deviation a, should be obtained with some clock (period) $T_{obs}$ (for example, $T_{obs}$=1, 3, 10, 30 or 60 seconds [IS-002, IS-003]). A "classical method" is to divide the time of algorithm operation into intervals of $T_{obs}$ duration and calculate standard deviation estimates for each of these intervals (as a square root of variance estimate) based on well-known formulas, see [Book-2], assuming that random process $\varepsilon_{\varphi i}^j$ over time $T_{obs}$ is stationary.

An alternative to this "classical" method is to use simplified method for random process $\varepsilon_{\varphi i}^j$ that uses the so-called single digital RC-circuit described by the following recursive equation:

$$y_i = (1 - \alpha_i^{RC}) y_{i-1} + \alpha_i^{RC} x_i, \quad (14)$$

where $x_i$ and $y_j$ are the input and output values of this RC-circuit, see, for example, expression (17.1) in [Book-1]. It can be shown that if a mixture of a constant signal and discrete white Gaussian noise (DWGN) with a variance of $\sigma^2$, is applied to the input of a low-pass filter (LPF) in the form of the RC-circuit with $\alpha_i^{RC} = \alpha^{RC} = $ const, then the output of such a filter will be a Gaussian random process, the expected value (EV) of which will be equal to the EV of the input process, and the variance will be equal (after the end of the transition processes) to:

$$\frac{\alpha^{RC}\sigma^2}{2-\alpha^{RC}}. \quad (15)$$

In this case, discrete samples at the input and output of such a low-pass filter will be related to each other by expression (14). This explains the term "single digital RC circuit": this circuit has a unity transmission coefficient for a constant voltage (signal). At $\alpha^{RC} < 1$ the variance of the output process is much less than the variance of the input process.

For the simplified method following is an input value for RC-circuit (14)

$$x_i = \left(\varepsilon_{\varphi,i}^j\right)^2, \quad (16)$$

and as an output magnitude:

$$y_i = \left(\sigma_\varphi^j\right)^2. \quad (17)$$

It can be shown that the time constant of the RC circuit (14) at $\alpha_i^R \times \alpha^{RC} = $ const is $$\tau^{RC} = -\frac{T_e}{\ln(1 - \alpha^{RC})}, \quad (18)$$

where $T_e$ is the period of sample arrival. At $\alpha^{RC} << 1$ $$\tau^{RC} \approx \frac{T_e}{\alpha^{RC}} \quad (18^*)$$

For an approximate correspondence between the "classical" and the simplified methods of estimating the Sigma-Phi index (i.e., estimate $\sigma_\varphi^j$), it should be selected $$\tau^{RC} \approx T_{obs}. \quad (19)$$

In the simplified method the RC-circuit starts to work for j-th satellite from a sample $i_j$ (i.e., $z_1 = 0$), when the j-th satellite has been acquired. Since this RC-circuit is a first order filter, then one initial condition needs to be set, namely, value $y_{i-1}$ in (14) for sample $i = i_j$, when satellite has been locked, i.e., for $z_j = 0$. One can set a zero initial condition, i.e., put into equation (14) a value of $y_{i-1} = 0$ and set $\alpha_i^{RC} = \alpha^{RC} = $ const. In this case, there will be quite significant transients in the RC circuit for about three time constants $3\tau^{RC}$, and at this time, the estimates of the Sigma-Phi index will be noticeably distorted. To reduce these distortions, one can use the following rule $$\alpha_i^{RC} = \begin{Bmatrix} 1, \text{ if } z_j = (i - i_j) = 0 \\ \alpha^{RC} = const, \text{ if } z_j = (i - i_j) > 0 \end{Bmatrix}. \quad (20)$$

According to this rule at $z_j = 0$ one sets $y_i = x_i$, and at $z_j > 0$ one uses (14).

The desired Sigma-Phi index is defined as $$\sigma_\varphi^j = \sqrt{y_i}. \quad (21)$$

Variant #2

Receiver clock offset (RCO) is usually understood as a scale determined by code measurements. In the given algorithm we use another scale called "extended" receiver clock offset (extended RCO). These two scales coincide only at initialization, and then they differ one from another. Note that extending is done by phase (not code!) measurements.

Since extended RCO will be seen more often in the algorithm, it is denoted $q_i$ (for example, $\hat{q}_i$ or $\bar{q}_i$).

The rate of change of the extended RCO is determined, in fact, by phase measurements (and not by code ones). It is denoted then as Vi (for example, K).

Section (D): Initialization

Initial Data

There is a receiver with known coordinates $(x_0, y_0, z_0)$. In addition, there are values of raw (synonymous—observed) pseudo-ranges (PR) according to code measurements and values of raw (synonymous—observed) phases.

Algorithm Initiation Steps

All the steps I-1 through I-9 are performed for all N satellites being tracked.

I-1. Calculate coordinates of each j-th navigation satellite $x_i^j, y_i^j, z_i^j$ and its clock offset $q_i^j$ at the moment of signal emission (calculated from the ephemeris information).

I-2. Calculate a priori ranges $D_i^j$ considering the Earth's rotation $D_{rot,i}^j$ for all N satellites being tracked:

$$D_i^j = \sqrt{(x_0 - x_i^j)^2 + (y_0 - y_i^j)^2 + (z_0 - z_i^j)^2} + D_{rot,i}^j + D_{trop,i}^j, \quad (22)$$
$$D_{rot,i}^j = \frac{\omega}{c}(x_i^j y_0 - y_i^j x_0)$$

where c is the speed of light; $D_{trop,i}^j$ is troposphere delay; co is the angular velocity of the Earth's rotation (in rad/s), and for the GPS and GLN satellites one needs to use specific values:

for GPS $\omega = 7.2921151467 \cdot 10^{-5}$ rad/s;

for GLN $\omega = 7.292115 \cdot 10^{-5}$ rad/s.

I-3. Calculate pseudo-ranges considering magnitudes $q_i^j$ for all N satellites being tracked:

$$\rho_{calc,i}^j = D_i^j - q_i^j. \quad (23)$$

I-4. Calculate pseudo-range residuals for all N satellites being tracked:

$$\delta\rho_i^j = \rho_i^j - \rho_{calc,i}^j, \quad (24)$$

where $\rho_i^j$ is the raw (observed) pseudo-range (obtained from code measurements) at the sample i for j-th satellite.

I-5. Calculate RCO estimate from code measurements for all satellites in tracking:

$$\hat{q}_i^\rho = \frac{1}{N_i} \sum_{j=1}^{N} \delta\rho_i^j. \quad (25)$$

I-6. Calculate phases considering RCO estimate $\hat{q}_i^\rho$ (25) and magnitudes $q_i^j$ for all N satellites being tracked:

$$\Phi_{calc,i}^j = D_i^j + \hat{q}_i^\rho - q_i^j. \quad (26)$$

I-7. Calculate corrected observed phases for all N satellites in tracking:

$$\delta\varphi_i^j = \varphi_i^j - \Phi_{calc,i}^j, \quad (27)$$

where $\varphi_i^j$ is the observed phase at the sample i for j-th satellite.

I-8. Consider corrected phases (27) as an estimate prediction and an estimate of the corrected phase—the same procedure for all N satellites in tracking:

$$\delta\hat{\varphi}_i^j = \delta\widetilde{\varphi}_i^j = \delta\varphi_i^j. \quad (28)$$

I-9. Assume:

$$\left.\begin{array}{l}\hat{q}_i = \hat{Q}_i = \hat{q}_i^p \\ \hat{V}_i = 0\end{array}\right\} \quad (29)$$

$$z = 1. \quad (30)$$

The initialization algorithm completes its operation at this moment (at the i-th sample), and the main algorithm continues to work at the next (i+1)-th sample, see Section (E).

Section (E): i-th Step of the Algorithm

As before, there is a receiver with known coordinates $(x_0, y_0, z_0)$. In addition, there are values of raw phases. All steps A-1 through A-22 are performed for all N satellites in tracking (except for the satellites that were tracked exactly on this i-th sample).

A-1. Calculate coordinates of each j-th navigation satellite $x_i^j, y_i^j, z_i^j$ and its clock offset $q_i^j$ at the moment of signal emission (calculated from the ephemeris information).

A-2. Find a prediction of extended RCO:

$$\bar{q}_i = \hat{q}_{i-1} + \hat{V}_{i-1} T_e \quad (31)$$

A-3. Calculate a priori ranges $D_i^j$ considering the Earth's rotation $D_{rot,i}^j$ (according to formula (22) above, reproduced again here):

$$\left.\begin{array}{l}D_i^j = \sqrt{(x_0 - x_i^j)^2 + (y_0 - y_i^j)^2 + (z_0 - z_i^j)^2} + D_{rot,i}^j + D_{trop,i}^j \\ D_{rot,i}^j = \frac{\omega}{c}(x_i^j y_0 - y_i^j x_0)\end{array}\right\} \quad (22)$$

where c is the speed of light; $D_{trop,i}^j$ is troposphere delay; $\omega$ is the angular velocity of the Earth's rotation (in rad/s), and for the GPS and GLN satellites you need to use specific values:

for GPS $\omega = 7.2921151467 \cdot 10^{-5}$ rad/s,
for GLN $\omega = 7.292115 \cdot 10^{-5}$ rad/s.

A-4. Calculate phase prediction considering extended RCO prediction $\bar{q}_i$ and $q_i^j$:

$$\varphi_{calc,i}^j = D_i^j + \bar{q}_i - q_i^j. \quad (32)$$

A-5. Calculate corrected observed phase:

$$\delta\varphi_i^j = \varphi_i^j - \varphi_{calc,i}^j, \quad (33)$$

where $\varphi_i^j$ is the observed phase at the sample i for j-th satellite.

A-6. Obtain a prediction of the corrected phase:

$$\delta\widetilde{\varphi}_i^j = \delta\hat{\varphi}_{i-1}^j. \quad (34)$$

A-7. Calculate discriminator signals for individual loops:

$$\zeta_i^j = \delta\varphi_i^j - \delta\widetilde{\varphi}_i^j \quad (35)$$

A-8. Reject (for procedure A-10) those signals $\zeta_i^j$, for which either SNR estimate $SNR_i^j$ becomes smaller than threshold $h_{SNR}$ (for example, 20-25 db.Hz) or signal $\zeta_i^j$ outstands the range $\pm h_\varphi$, (for example, 0.05 m). Only K non-rejected satellites are left from N satellites.

A-9. Set weights for K non-rejected satellites:

$$w_i^j = 10^{0.1 SNR_i^j}. \quad (4)$$

A-10. Calculate discriminator signal for common loop based on individual loop discriminator signals for K non-rejected satellites:

$$Z_i^Q = \frac{\sum_{j=1}^K w_i^j \zeta_i^j}{\sum_{j=1}^K w_i^j}. \quad (5*)$$

A-11. Calculate extended RCO estimate:

$$\hat{q}_i = \hat{q}_{i-1} + \hat{V}_{i-1} \cdot T_e + Z_i^Q. \quad (36)$$

A-12. Calculate prediction values:

$$\left.\begin{array}{l}\bar{Q}_i = \hat{Q}_{i-1} + \hat{V}_{i-1} T_e \\ \bar{V}_i = \hat{V}_{i-1}\end{array}\right\} \quad (37)$$

A-13. Calculate:

$$\delta_i^Q = \hat{q}_i - \bar{Q}_i. \quad (38)$$

A-14. If z<9, update coefficients according to formula:

$$\alpha^{smooth} = \frac{2(2z-1)}{z(z+1)}; \beta^{smooth} = \frac{6}{z(z+1)}. \quad (39)$$

Otherwise, (z>8) do not change the weights ("freeze weights").

A-15. Calculate:

$$\hat{Q}_i = \overline{Q}_i + \alpha^{smooth} \delta_i^Q$$
$$\hat{V}_i = \overline{V}_i + \frac{\beta^{smooth} \delta_i^Q}{T_e}$$
(40)

A-16. Carry out a refined calculation for all N satellites:

$$\Phi_{calc,i}^j = D_i^j + \hat{q}_i - q_i^j.$$
(41)

A-17. Generate refined corrected phases for all N satellites:

$$\delta\Phi_i^j = \varphi_i^j - \Phi_{calc,i}^j.$$
(42)

A-18. Calculate refined individual loop discriminator signals for all N satellites:

$$Z_i^j = \delta\Phi_i^j - \delta\overline{\varphi}_i^j.$$
(43)

A-19. Update coefficient for each j-th satellite if $z_j > 1$ according to formula:

$$\alpha^\varphi = \alpha_{st},$$
(44)

where $\alpha_{st}$ is the user-specified constant in a range of 0.0001 . . . 0.01. Otherwise, (i.e., at $z_j=1$) a re-start occurs (or a lock of a new satellite in tracking), and the procedure proceeds to Section (H): below.

A-20. Calculate refined estimates of the corrected phases for all N satellites:

$$\delta\hat{\varphi}_i^j = \delta\overline{\varphi}_i^j + \alpha^\varphi Z_i^j.$$
(45)

A-21. Calculate test statistic for all N satellites:

$$\varepsilon_{\varphi,i}^j = \delta\Phi_i^j - \delta\hat{\varphi}_i^j.$$
(46)

A-22. Calculate smoothed test statistic for all N satellites:

$$\varepsilon_{\varphi,i}^{smooth,j} = (1-\alpha^\varepsilon)\varepsilon_{\varphi,i-1}^{smooth,j} + \alpha^\varepsilon \varepsilon_{\varphi,i}^j.$$
(47)

Here $\alpha^\varepsilon$ is the user-specified parameter (explicit or implicit; this parameter is calculated based on another user-specified value—time constant $\tau^\varepsilon$ according to (1)). Value $\alpha^\varepsilon$ is within the range of 0.05 . . . 0.1.

For clarity, let us assume that the initial value of the smoothed test statistics $\varepsilon_{\varphi,0}^{smooth}=0$ (where i=0 corresponds to the moment of starting to track this j-th satellite).

A-23. There are two algorithms of processing smoothed test statistics:
  simplified method—see Section (F) below;
  conventional method—see Section (G) below.

As a result of operation of the smoothed test statistic processing algorithm, the user gets the desired index value $\sigma_\varphi$ with period of 60 sec.

Figure 3:
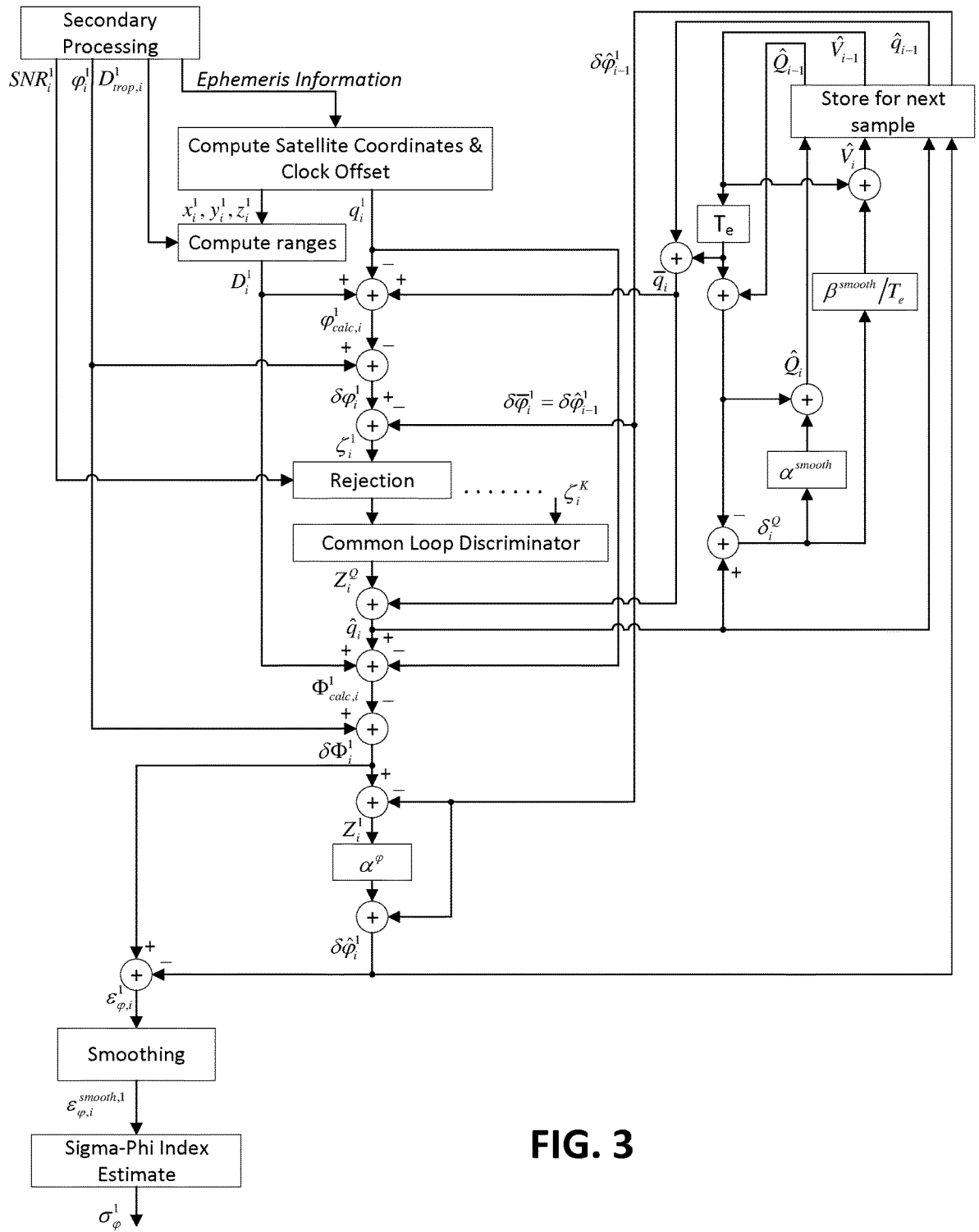
FIG. 3 illustrates a flowchart for measuring phase ionosphere scintillations according to the second embodiment.

FIG. 3 illustrates a flowchart for determining ionosphere scintillations according to the second embodiment, showing steps A-1 through A-23. These operations need to be done at the i-th sample with one satellite (namely, with the first satellite having j=1); for the rest of the satellites (from j=2 up to j=N) the operations are similar.

Input values for the diagram in FIG. 3 are:
(1) values of the following variables calculated on the previous (i−1)-th sample:

$$\hat{q}_{i-1}; \hat{V}_{i-1}; \delta\hat{\varphi}_{i-1}^1;$$

(2) observed phase $\varphi_i^1$ measured by the receiver;
(3) satellites' ephemerides which help to calculate coordinates and the extended clock offset of the first satellite:

$$x_i^1; y_i^1; z_i^1; q_i^1;$$

(4) troposphere corrections $D_{trop,i}^1$.

Output values of the same diagram in FIG. 3 are:
(1) new (for the i-th sample) variables:

$$\hat{q}_i; \hat{V}_i; \delta\hat{\varphi}_i^1;$$

(2) the estimation of IS index Sigma-Phi of this first satellite calculated by smoothed resulting residual $\varepsilon_{\varphi,i}^{smooth,1}$ used as test statistic. Algorithm to estimate index value by test statistic is described below.

As a result of operation of the smoothed test statistic processing algorithm, the user gets the desired index value $\sigma_\varphi$ with period of 60 sec.

Section (F): Simplified Method of Processing Smoothed Test Statistics

So, after step A-22 of the main algorithm (see Section (E)) there is determined smoothed test statistic $\varepsilon_{\varphi,i}^{smooth,j}$ (see (47)) for each j-th satellite from N satellites being tracked. For the simplified method, step S-23, described below, starts to work at step A-23 of the main algorithm.

S-23. Set:

$$\alpha^{RC} = \begin{cases} 1, & \text{if } z_j = 1 \\ \alpha_{st}^{RC}, & \text{if } z_j > 1 \end{cases}.$$
(48)

Where constant $\alpha_{st}^{RC}$ is calculated according to formula (1) based on time constant $\tau^{RC}$, which, in its turn, is equal to the user-defined time interval $T_{obs}$ ($T_{obs}$=1, 3, 10, 30 or 60 s):

$$\tau^{RC} = T_{obs}.$$
(49)

If it is required to output estimates of the index $\sigma_\varphi$ for all 5 mentioned values of $T_{obs}$, then it will be necessary to maintain 5 RC-circuits for each satellite.

S-24. Calculate the variance estimate for each j-th satellite from N satellites being tracked using the formula:

$$(\sigma_{\varphi,i}^j)^2 = (1 - \alpha_{z_j}^{RC})(\sigma_{\varphi,i-1}^j)^2 + \alpha_{z_j}^{RC}(\varepsilon_{\varphi,i}^{smooth,j})^2. \quad (50)$$

Taking into account (48), initial value $(\sigma_{\varphi,i-1}^j)^2$ may not be determined at re-acquisition of the j-th satellite: in (50) $(\sigma_{\varphi,i-1}^j)$ will be multiplied by 0. In fact, RC-circuit is initialized by the first square of the smoothed test statistic.

Formula (50), in fact, is that of mean square formula. Considering the small expected value, mean square and variance estimate are practically the same—this fact is used in formula (50).

S-25. Every 60 seconds output to the user the desired index $\sigma_\varphi$ for the j-th satellite, calculated by the formula:

$$\sigma_\varphi^j = \sqrt{(\sigma_{\varphi,i}^j)^2}. \quad (51)$$

After the expiration of the next 60-second interval, it is not required to reset and re-initialize the estimate (50).

Section (G): Conventional Method of Processing Smoothed Test Statistics

Thus, after step A-22 of the main algorithm (see. Section (E)) there is determined smoothed test statistic $\varepsilon_{\varphi,i}^{smooth,j}$ (see formula (47)) for each j-th satellite from N satellites being tracked. For conventional method, step T-23 (described below) starts to work at step A-23 of the main algorithm.

T-23. For the user-defined time interval $T_{obs}$ ($T_{obs}$=1, 3, 10, 30 or 60 s) for each j-th satellite there are generated arrays of sample values of smoothed test statistic $\varepsilon_{\varphi,i}^{smooth,j}$ and calculated sample expected values $\hat{m}_\varphi^{j,T_{obs}}$, as well as variances $\hat{D}_\varphi^{T_{obs}}$ of these arrays. Said sample expected values and variances calculated over observation time $T_{obs}$ are determined by expressions:

$$\left. \begin{array}{l} \hat{m}_\varphi^{j,T_{obs}} = \dfrac{1}{M}\sum_{n=1}^M \varepsilon_{\varphi,n}^{smooth,j} \\ \hat{D}_\varphi^{j,T_{obs}} = \dfrac{1}{M-1}\sum_{n=1}^M \left((\varepsilon_{\varphi,n}^{smooth,j})^2 - (\hat{m}_\varphi^{j,T_{obs}})^2\right) \end{array} \right\}; \quad (52)$$

where M is the sample number (with period $T_e$) over $T_{obs}$:

$$M = \frac{T_{obs}}{T_e}. \quad (53)$$

T-24. Average variance estimates over time interval of 60 s and calculate the desired index $\sigma_\varphi$ for the j-th satellite according to $$\sigma_\varphi^j = \sqrt{\frac{60}{T_{obs}} \sum_{60\ sec} \hat{D}_\varphi^{j,T_{obs}}}. \quad (54)$$

Note. Before extracting the root in (54), one should check the argument for being non-negative. Otherwise, instead of operation (54), give a predefined small positive constant as an estimate of the index $\sigma_\varphi$ (for example, $10^{-8}$ [m]).

Value (54) is outputted to the user with period 60 sec.

Section (H): The Appearance of a New Satellite in Tracking

Assume that the algorithms have already been initialized. In the $i_j$-th sample, the j-th satellite is locked. In this $i_j$-th sample for this j-th satellite, neither the initialization algorithm nor the main algorithm work.

At the next $i=(i_j+1)$-th sample, set the index $z_j=1$ and the coefficient $\alpha^{ind}=1$ (needed at step A-20, see above in Section (E)). On this i-th sample, the main algorithm works for this j-th satellite with the following difference in step A-6: step A-6* must be performed instead.

A-6*. Obtain a corrected phase prediction for a newly appeared satellite is done by the formula (i.e. instead of (34) formula (55) is used):

$$\delta\overline{\varphi}_i^j = \delta\varphi_i^j. \quad (55)$$

Section (I): Loss of Satellite Tracking

In this case test statistics for this satellite are zeroed (including $\varepsilon_{\varphi,i}^{smooth,j}=0$). When this satellite will be tracked again, algorithm of Section (H) works for it.

Comparison of Variants #1 and #2

Variants #1 and #2 have some common features, in particular:
(1) Both algorithms work best when the receiver does not move, i.e., it is stationary;
(2) Dynamics of satellite movement are compensated by ephemeris data;
(3) Both variants use a weight scheme based on SNR estimates;
(4) Any changes in receiver quartz phase (or frequency) do not lead to a change in the test statistics, as long as the system is operating in linear mode.

However, there are differences between these variants, in particular:
(1) Variant #2 uses separate loop filters, and variant #1 uses combined loop filters;
(2) In variant #1, satellite dynamics are compensated by adding to a phase prediction the estimates of calculated range increments based on ephemeris data, and in variant #2—the calculated range is subtracted from phase measurements;
(3) In variant #2, the second order smoothing filter is external relative to weight summation (when generating common loop discriminator signal). In variant #1 there is no such an external filter.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

REFERENCES (ALL INCORPORATED HEREIN BY REFERENCE IN THEIR ENTIRETY)

[IS-001] Van der Meeren, C., Oksavik, K., Lorentzen, D., Moen, J. I., & Romano, V., *GPS scintillation and irregularities at the front of an ionization tongue in the nightside polar ionosphere*, Journal of Geophysical Research: Space Physics, 119 (10), 8624-8636 (2014).

[IS-002] Van Dierendonck, A. J., *Eye on the ionosphere: measuring ionospheric scintillation effects from GPS signals*, GPS Solutions, 2(4), 60-63 (1999).

[IS-003] GSV4004B GPS IONOSPHERIC SCINTILLATION & TEC MONITOR (GISTM). USER'S MANUAL, http://indicoictp.it/event/a08148/session/90/contribution/56/material/0/0.pdf. Last access: Oct. 15, 2021.

[ION-98] Zhodzishsky, M., Yudanov, S., Veitsel, V., & Ashjaee, J., *Co-op tracking for carrier phase*, in Proceedings of the 11th International Technical Meeting of the Satellite Division of The Institute of Navigation (ION GPS 1998) (pp. 653-664) (September 1998).

[Book-1] Boriskin A. D., Veitsel A. V., Veitsel V A, Zhodzishsky M. I., Milutin D. S., *The equipment of high-precision positioning by signals of global navigation satellite systems: receivers-consumers of navigation information*, Moscow, MAI-PRINT Publ. 292 p. (in Russian) (2010).

[Book-2] Tsokos, Chris P. and Ramachandran, Kandethody M., *Mathematical Statistics with Applications*, Elsevier Science (2009).

What is claimed is:

1. A method of measuring ionosphere scintillation phase index Sigma-Phi ($\sigma_\varphi$), the method comprising:
   (a) receiving GNSS (Global Navigation Satellite System) signals in an antenna of a GNSS receiver;
   (b) converting the GNSS signals into digital form;
   (c) using a processor of the GNSS receiver to analyze the digitized GNSS signals to—
   for each of N satellites being tracked, calculate a phase prediction at an i-th sample;
   for each of the N satellites, calculate an individual loop discriminator signal based on the phase prediction;
   reject the i-th samples of some of the N satellites, such that K non-rejected satellites remain;
   calculate a common loop discriminator signal based on the individual loop discriminator signals of the non-rejected K satellites;
   calculate a phase estimate and a Doppler frequency estimate at the i-th sample for each of the N satellites based on the individual loop discriminator signal;
   calculate a test statistic based on the phase estimate at the i-th sample and an observed phase for each of the N satellites;
   calculate index Sigma-Phi ($\sigma_\varphi$) as standard deviation estimation of the test statistic for each of the N satellites; and
   output the measurement of the index Sigma-Phi ($\sigma_\varphi$) for each of the N satellites.

2. The method of claim 1, wherein the phase prediction ($\bar{\varphi}_i^j$) is calculated as a sum of: 1) a phase estimate $\hat{\varphi}_{i-1}^j$ of the j-th satellite at a previous (i−1)-th sample; 2) a product of a Doppler frequency estimate $\hat{\omega}_{i-1}^j$ and an epoch duration of $T_e$; and 3) a calculated phase increment $\Delta_i^j$ of the j-th satellite over the epoch duration of $T_e$ due to a movement of the j-th satellite as follows:

$$\bar{\varphi}_i^j = \hat{\varphi}_{i-1}^j + \hat{\omega}_{i-1}^j T_e + \Delta_i^j.$$

3. The method of claim 1, wherein the rejecting is based on signal to noise ratio (SNR) of each of the N satellites.

4. The method of claim 1, wherein N and K can vary from i-th sample to (i+1)-th sample.

5. The method of claim 1, wherein the individual loop discriminator signal ($Z_i^j$) is calculated as a difference between the observed phase $\varphi_i^j$ and its prediction $\bar{\varphi}_i^j$ as follows:

$$Z_i^j = \varphi_i^j - \bar{\varphi}_i^j.$$

6. The method of claim 5, wherein those individual loop discriminator signals ($Z_i^j$), for which either signal to noise ratio (SNR) estimate $SNR_i^j$ is less than a threshold $h_{SNR}$ or signal $Z_i^j$ is outside a range $\pm h_\varphi$, are rejected.

7. The method of claim 1, wherein the common loop discriminator signal ($Z_i^Q$) is calculated as a weight mean based on the individual loop discriminator signals of the non-rejected K satellites according to $$Z_i^Q = \frac{\sum_{j=1}^{K} w_i^j Z_i^j}{\sum_{j=1}^{K} w_i^j},$$

wherein weights $w_i^j$ for K non-rejected individual loop discriminator signals are set as follows:

$$w_i^j = 10^{0.1 SNR_i^j}.$$

8. The method of claim 1, wherein the phase estimate ($\hat{\varphi}_i^j$); and the Doppler frequency estimate ($\hat{\omega}_i^j$) at the i-th sample for each of the N satellites are calculated based on the common loop discriminator signal ($Z_i^Q$) as follows:

$$\left.\begin{aligned}\hat{\varphi}_i^j &= \bar{\varphi}_i^j + \alpha^{ind} \cdot (Z_i^j - Z_i^Q) + \alpha^q Z_i^Q \\ \hat{\omega}_i^j &= \hat{\omega}_{i-1}^j + \frac{\beta^q}{T_e} Z_i^Q\end{aligned}\right\},$$

wherein $\alpha^q$ is a transfer coefficient for a proportional branch of the common loop filter in a range of 0.3 to 1, $\alpha^{ind}$ is a transfer coefficient for a proportional branch of the individual loop filter in a range of 0.05 to 1, and $\beta^q$ is a transfer coefficient for an integrating branch of the common loop filter in a range of 0.05 to 1.

9. The method of claim 1, wherein the test statistic ($\varepsilon_{\varphi,i}^j$) for each of the N satellites is calculated based on the phase estimate $\hat{\varphi}_i^j$ at the i-th sample and the observed phase $\varphi_i^j$ as follows:

$$\varepsilon_{\varphi,i}^j = \varphi_i^j - \hat{\varphi}_i^j.$$

10. A method of measuring ionosphere scintillation index Sigma-Phi ($\sigma_\varphi$), the method comprising:
   (a) receiving GNSS (Global Navigation Satellite System) signals in an antenna of a GNSS receiver;
   (b) converting the GNSS signals into digital form;
   (c) using a processor of the GNSS receiver to analyze the digitized GNSS signals to—
   for each of the N satellites being tracked, calculate coordinates $x_i^j, y_i^j, z_i^j$ of each j-th navigation satellite at an i-th sample, and calculate its clock offset $q_i^j$ at a moment of signal generation;

predict extended receiver clock offset (eRCO) at the i-th sample;

for each of the N satellites, calculate ranges $D_i^j$;

for each of the N satellites, calculate a phase prediction based on the prediction of the eRCO;

for each of the N satellites, calculate a corrected observed phase based on the phase prediction;

for each of the N satellites, calculate an individual loop discriminator signal based on the corrected observed phase;

reject the i-th samples of some of the N satellites, such that K non-rejected satellites remain;

calculate a common loop discriminator signal based on the individual loop discriminator signals of the K non-rejected satellites;

calculate an eRCO estimate based on the common loop discriminator signal;

estimate phase and drift velocity of the eRCO based on the eRCO estimate;

for each of the N satellites, calculate a refined phase estimate based on the eRCO estimate;

for each of the N satellites, calculate a refined corrected phase based on the refined phase estimate;

for each of the N satellites, calculate a refined individual loop discriminator signal based on the refined corrected phase;

for each of the N satellites, calculate a refined estimate of the corrected phase based on the refined individual loop discriminator signal;

calculate a smoothed test statistic based on the refined estimate of the corrected phase for each of the N satellites;

calculate index Sigma-Phi ($\sigma_\varphi$) as a standard deviation estimation of the test statistic for each of the N satellites; and output the measurement of the index Sigma-Phi ($\sigma_\varphi$) for each of the N satellites.

11. The method of claim 10, wherein the coordinates of each j-th navigation satellite $x_i^j$, $y_i^j$, $z_i^j$ and its clock offset $q_i^j$ at the moment of signal generation are calculated based on ephemeris information.

12. The method of claim 11, wherein the prediction of eRCO ($\bar{q}_i$) at the i-th sample is calculated as a sum of: 1) eRCO estimate $\hat{q}_{i-1}$ obtained at the previous (i−1)-th sample, and 2) a product of eRCO drift velocity $\hat{V}_{i-1}$ and an epoch duration of $T_e$ (a period of arriving raw data from primary to secondary processing) as follows:

$$\bar{q}_i = \hat{q}_{i-1} + \hat{V}_{i-1} T_e$$

13. The method of claim 10, wherein the range ($D_i^j$) for each of the N satellites is calculated using Earth's rotation $D_{rot,i}^j$ according to $$D_i^j = \sqrt{(x_0 - x_i^j)^2 + (y_0 - y_i^j)^2 + (z_0 - z_i^j)^2} + D_{rot,i}^j + D_{trop,i}^j$$
$$D_{rot,i}^j = \frac{\omega}{c}(x_i^j y_0 - y_i^j x_0)$$

where c is a speed of light; $D_{trop,i}^j$ is troposphere delay, $\omega$ is angular velocity of the Earth's rotation.

14. The method of claim 10, wherein the phase prediction ($\varphi_{calc,i}^j$) for each of the N satellites is calculated considering eRCO prediction $\bar{q}_i$ and $q_i^j$:

$$\varphi_{calc,i}^j = D_i^j + \bar{q}_i - q_i^j.$$

15. The method of claim 10, wherein the corrected observed phase ($\delta\varphi_i^j$) is calculated as follows:

$$\delta\varphi_i^j = \varphi_i^j - \varphi_{calc,i}^j,$$

wherein $\varphi_i^j$ is the observed phase at the sample i for satellite j.

16. The method of claim 10, wherein the individual loop discriminator signal) ($\zeta_i^j$) is calculated as follows:

$$\zeta_i^j = \begin{cases} \delta\varphi_i^j - \delta\hat{\varphi}_{i-1}^j, & \text{if } z_j > 1 \\ 0, & \text{if } z_j = 1 \end{cases},$$

where $z_j$ is a number of a sample since satellite j was acquired by the receiver.

17. The method of claim 10, wherein those individual loop discriminator signals $\zeta_i^j$, for which either signal to noise ratio (SNR) estimate $SNR_i^j$ is less than a threshold $h_{SNR}$ or signal $\zeta_i^j$ is outside a range $\pm h_\varphi$, are rejected.

18. The method of claim 10, wherein the common loop discriminator signal ($Z_i^Q$) is calculated as a weight mean based on the individual loop discriminator signals of the non-rejected K satellites according to $$Z_i^Q = \frac{\sum_{j=1}^{K} w_i^j \zeta_i^j}{\sum_{j=1}^{K} w_i^j},$$

wherein weights $w_i^j$ for K non-rejected individual loop discriminator signals are set as follows:

$$w_i^j = 10^{0.1 SNR_i^j}.$$

19. The method of claim 10, wherein the eRCO estimate ($\hat{q}_i$) is calculated as follows:

$$\hat{q}_i = \hat{q}_{i-1} + \hat{V}_{i-1} \cdot T_e + Z_i^Q,$$

wherein $\hat{V}_{i-1}$ is a drift velocity of the eRCO calculated.

20. The method of claim 10, wherein the phase estimate ($\hat{Q}_i$) and the drift velocity estimate ($\hat{V}_i$) of the eRCO are calculated as follows:

1) Calculating predictions of phase ($\bar{Q}_i$) and drift velocity ($\bar{V}_i$) of the eRCO as $$\bar{Q}_i = \hat{Q}_{i-1} + \hat{V}_{i-1} T_e$$
$$\bar{V}_i = \hat{V}_{i-1}$$

2) Calculating a residual ($\delta_i^Q$)

$$\delta_i^Q = \hat{q}_i - \overline{Q}_i$$

3) Calculating the phase estimate ($\hat{Q}_i$) and the drift velocity estimate ($\hat{V}_i$) of the eRCO:

$$\left. \begin{array}{l} \hat{Q}_i = \overline{Q}_i + \alpha^{smooth}\delta_i^Q \\ \hat{V}_i = \overline{V}_i + \dfrac{\beta^{smooth}\delta_i^Q}{T_e} \end{array} \right\},$$

wherein $\alpha^{smooth}$ in a range of 0.3 to 1 and $\beta^{smooth}$ in a range of 0.05 to 1.

21. The method of claim 10, wherein the refined phase estimate $\Phi_{calc,i}^j$ is calculated based on the eRCO estimate as follows:

$$\Phi_{calc,i}^j = D_i^j + \hat{q}_i - q_i^j$$

22. The method of claim 10, wherein the refined corrected phase $\delta\Phi_i^j$ is calculated based on the refined phase estimate as follows:

$$\delta\Phi_i^j = \varphi_i^j - \Phi_{calc,i}^j$$

23. The method of claim 10, wherein the refined individual loop discriminator signal ($Z_i^j$) is calculated based on the refined corrected phase as follows:

$$Z_i^j = \delta\Phi_i^j - \delta\overline{\varphi}_i^j$$

24. The method of claim 10, wherein the refined estimate of the corrected phase is calculated based on the refined individual loop discriminator signal according to formula:

$$\delta\hat{\varphi}_i^j = \delta\overline{\varphi}_i^j + \alpha^\varphi Z_i^j,$$

wherein coefficients $\alpha^\varphi$ are calculated as follows:

$$\alpha^\varphi = \left\{ \begin{array}{ll} 1, & \text{if } z_j = 1 \\ 0.0001 \ldots 0.01, & \text{if } z_j > 1 \end{array} \right\}.$$

and where $z_j$ is a number of a sample since satellite j was acquired by the receiver.

25. The method of claim 10, wherein the smoothed test statistic ($\varepsilon_{\varphi,i}^{smooth,j}$) is calculated based on the refined estimate of the corrected phase $\delta\hat{\varphi}_i^j$ as follows:

$$\varepsilon_{\varphi,i}^{smooth,j} = (1-\alpha^\varepsilon)\varepsilon_{\varphi,i-1}^{smooth,j} + \alpha^\varepsilon\left(\delta\Phi_i^j - \delta\hat{\varphi}_i^j\right),$$

wherein $\alpha^\varepsilon$ is a user-specified parameter in a range of 0.05 to 0.1.

26. The method of claim 10, wherein the method is initialized by:
1) For each of the N satellites being tracked, calculating coordinates $x_i^j$, $y_i^j$, $z_i^j$ of each j-th navigation satellite at an i-th sample, as well as its clock offset $q_{SV,i}^j$ at the moment of signal emission based on ephemeris information;
2) For each of the N satellites, calculating the ranges $D_i^j$ considering the Earth's rotation $D_{rot,i}^j$ according to formula:

$$\left. \begin{array}{l} D_i^j = \sqrt{(x_0 - x_i^j)^2 + (y_0 - y_i^j)^2 + (z_0 - z_i^j)^2} + D_{rot,i}^j + D_{trop,i}^j \\ D_{rot,i}^j = \dfrac{\omega}{c}\left(x_i^j y_0 - y_i^h x_0\right) \end{array} \right\}$$

where c is a speed of light, $D_{trop,i}^j$ is troposphere delay, and $\omega$ is angular velocity of the Earth's rotation;
3) For each of the N satellites, calculating pseudo-ranges considering magnitudes $q_i^j$ as follows:

$$\rho_{calc,i}^j = D_i^j - q_i^j$$

4) For each of the N satellites, calculating pseudo-range residuals:

$$\delta\rho_i^j = \rho_i^j - \rho_{calc,i}^j$$

where $\rho_i^j$ is an observed pseudo-range;
5) Calculating a receiver clock offset estimate ($\hat{q}_i^\rho$) from code measurements for all N satellites:

$$\hat{q}_i^\rho = \frac{1}{N}\sum_{j=1}^N \delta\rho_i^j$$

6) For each of the N satellites, calculating phases considering receiver clock offset estimate $\hat{q}_i^\rho$ and magnitudes $q_i^j$ as follows:

$$\Phi_{calc,i}^j = D_i^j + \hat{q}_i^\rho - q_i^j$$

7) For each of the N satellites, calculating corrected observed phases:

$$\delta\varphi_i^j = \varphi_i^j - \Phi_{calc,i}^j$$

where $\varphi_i^j$ is the observed phase at the i-th sample for j-th satellite;
8) For each of the N satellites, setting up an estimate prediction and an estimate of the corrected phase as follows:

$$\delta\hat{\varphi}_i^j = \delta\overline{\varphi}_i^j = \delta\varphi_i^j;$$

9) Setting:

$$\left.\begin{array}{l}\hat{q}_i = \hat{Q}_i = \hat{q}_i^p \\ \hat{V}_i = 0\end{array}\right\}$$

27. The method of claim 10, wherein the rejecting is based on signal to noise ratio (SNR) of each of the N satellites.

28. The method of claim 10, wherein N and K can vary from i-th sample to (i+1)-th sample.

29. A receiver configured to measure ionosphere scintillation index Sigma-Phi ($\sigma_\varphi$), the receiver comprising:
- an antenna receiving GNSS (Global Navigation Satellite System) signals;
- a converter of the GNSS signals into digital form;
- a processor analyzing the digitized GNSS signals, the processor configured to
  - for each of N satellites being tracked, calculate a phase prediction at an i-th sample;
  - for each of the N satellites, calculate an individual loop discriminator signal based on the phase prediction;
  - reject the i-th samples of some of the N satellites, such that K non-rejected satellites remain;
  - calculate a common loop discriminator signal based on the individual loop discriminator signals of the non-rejected K satellites;
  - calculate a phase estimate and a Doppler frequency estimate at the i-th sample for each of the N satellites based on the individual loop discriminator signal;
  - calculate a test statistic based on the phase estimate at the i-th sample and an observed phase for each of the N satellites;
  - calculate index Sigma-Phi ($\sigma_\varphi$) as standard deviation estimation of the test statistic for each of the N satellites; and
  - output the measurement of the index Sigma-Phi ($\sigma_\varphi$) for each of the N satellites.

30. A receiver configured to measure ionosphere scintillation index Sigma-Phi ($\sigma_\varphi$), the receiver comprising:
- an antenna receiving GNSS (Global Navigation Satellite System) signals;
- a converter of the GNSS signals into digital form;
- a processor analyzing the digitized GNSS signals, the processor configured to
  - predict extended receiver clock offset (eRCO) at the i-th sample;
  - for each of the N satellites, calculate ranges $D_i^j$;
  - for each of the N satellites, calculate a phase prediction based on the prediction of the eRCO;
  - for each of the N satellites, calculate a corrected observed phase based on the phase prediction;
  - for each of the N satellites, calculate an individual loop discriminator signal based on the corrected observed phase;
  - reject the i-th samples of some of the N satellites, such that K non-rejected satellites remain;
  - calculate a common loop discriminator signal based on the individual loop discriminator signals of the K non-rejected satellites;
  - calculate an eRCO estimate based on the common loop discriminator signal;
  - estimate phase and drift velocity of the eRCO based on the eRCO estimate;
  - for each of the N satellites, calculate a refined phase estimate based on the eRCO estimate;
  - for each of the N satellites, calculate a refined corrected phase based on the refined phase estimate;
  - for each of the N satellites, calculate a refined individual loop discriminator signal based on the refined corrected phase;
  - for each of the N satellites, calculate a refined estimate of the corrected phase based on the refined individual loop discriminator signal;
  - calculate a smoothed test statistic based on the refined estimate of the corrected phase for each of the N satellites;
  - calculate index Sigma-Phi ($\sigma_\varphi$) as a standard deviation estimation of the test statistic for each of the N satellites; and
  - output the measurement of the index Sigma-Phi ($\sigma_\varphi$) for each of the N satellites.

* * * * *